(12) United States Patent
Fang et al.

(10) Patent No.: US 6,510,875 B2
(45) Date of Patent: Jan. 28, 2003

(54) INFLATING DEVICE AND METHOD OF USE

(75) Inventors: Jiafu Fang, Spring, TX (US); Troy H. Scriven, Waterford, NY (US); Dewey P. Szemenyei, The Woodlands, TX (US)

(73) Assignee: Pennzoil, Houston, TX (US)

( * ) Notice: Subject to any disclaimer, the term of this patent is extended or adjusted under 35 U.S.C. 154(b) by 0 days.

(21) Appl. No.: 09/738,576

(22) Filed: Dec. 15, 2000

(65) Prior Publication Data

US 2001/0042571 A1 Nov. 22, 2001

Related U.S. Application Data

(63) Continuation of application No. 09/616,360, filed on Jul. 14, 2000.
(60) Provisional application No. 60/143,925, filed on Jul. 14, 1999.

(51) Int. Cl.[7] ............................. B65B 31/00; B67C 3/00
(52) U.S. Cl. ............................. 141/4; 141/9; 141/38; 141/44; 141/67; 141/95; 141/100
(58) Field of Search ............................. 141/4, 9, 10, 38, 141/44, 67, 95, 100, 313, 392; 102/530; 446/221

(56) References Cited

U.S. PATENT DOCUMENTS

| | | | |
|---|---|---|---|
| 3,723,205 A | * 3/1973 | Scheffee | 149/19.91 |
| 3,777,692 A | * 12/1973 | Baccaglini et al. | 114/54 |
| 3,833,041 A | 9/1974 | Glad et al. | |
| 3,834,433 A | 9/1974 | Thompson | |
| 3,850,217 A | 11/1974 | Edwards et al. | |
| 3,877,496 A | 4/1975 | Sperberg | |
| 3,912,562 A | 10/1975 | Garner | |
| 3,931,843 A | 1/1976 | Edwards et al. | |
| 3,946,783 A | 3/1976 | Edwards et al. | |
| 3,976,221 A | 8/1976 | Martin et al. | |
| 4,054,163 A | 10/1977 | Brown, Jr. et al. | |
| 4,062,288 A | 12/1977 | Millray | |
| 4,066,415 A | * 1/1978 | Kasama et al. | 23/281 |
| 4,097,241 A | 6/1978 | Garner et al. | |
| 4,163,467 A | 8/1979 | Dobson | |
| 4,168,015 A | 9/1979 | Robinette | |
| 4,296,084 A | * 10/1981 | Adams et al. | 423/351 |
| 4,489,855 A | 12/1984 | Boetger | |
| 4,501,825 A | 2/1985 | Magyar et al. | |
| 4,513,803 A | 4/1985 | Reese | |
| 4,929,214 A | * 5/1990 | Liebermann | 446/221 |
| 4,970,242 A | 11/1990 | Lehman | |
| 5,062,367 A | * 11/1991 | Hayashi et al. | 102/530 |
| 5,110,014 A | 5/1992 | Doundoulakis | |
| 5,124,395 A | 6/1992 | Abramowski et al. | |
| 5,284,895 A | 2/1994 | Gupta | |
| 5,338,776 A | 8/1994 | Peelor et al. | |
| 5,458,165 A | 10/1995 | Liebmann, Jr. | |
| 5,500,456 A | 3/1996 | Hughett et al. | |
| 5,566,730 A | 10/1996 | Liebmann, Jr. | |
| 5,618,912 A | 4/1997 | Fang | |
| 5,705,604 A | 1/1998 | Fang | |

FOREIGN PATENT DOCUMENTS

| | | |
|---|---|---|
| EP | 867494 A3 | 9/1998 |
| EP | 867494 A2 | 9/1998 |

* cited by examiner

*Primary Examiner*—Timothy L. Maust
(74) *Attorney, Agent, or Firm*—Jenkens & Gilchrist A Professional Corporation

(57) ABSTRACT

A new inflating device and method for inflating an inflatable object are described. The inflating device includes two compartments: one containing a gas-generating agent and the other containing an activating agent. When mixed, the gas-generating agent and the activating agent produces a gas in situ. The device further includes an activator connected to both compartments and is capable of effectuating mixing between the two agents upon activation. A hose assembly of the inflating device delivers a the gas generated to an inflatable object, such as a flat tire.

17 Claims, 1 Drawing Sheet

INFLATING DEVICE AND METHOD OF USE

CROSS REFERENCE TO RELATED APPLICATIONS

This patent application claims priority to U.S. Provisional Application Serial No. 60/143,925, entitled "Tire Sealing and Inflating Composition and Method of Use," filed on Jul. 14, 1999, and is a continuation of U.S. patent application Ser. No. 09/616,360, filed Jul. 14, 2000.

FEDERALLY SPONSORED RESEARCH

Not applicable.

REFERENCE TO MICROFICHE APPENDIX

Not applicable.

FIELD OF THE INVENTION

This invention relates to a device and method for inflating an inflatable object. More particularly, this invention relates to a method and device for generating a gas to inflate a flat tire.

BACKGROUND OF THE INVENTION

There are numerous situations in which a handy, portable pressurized air source is needed. For example, when the tire pressure of a vehicle becomes too low, the vehicle driver may need to increase the tire pressure by supplying more air into the tires. The driver could do so by driving to a gas station nearby and inflate the tire by an air pump at the station. However, when circumstances prevent the vehicle driver from driving to a nearby gas station, an alternative air source is required. In these situations, a portable pressurized air source would fulfill such a need. Similarly, an inflatable recreation device, such as a swimming pool floatation aide and a foldable boat, needs to be inflated before it can be used. It is not always practicable to take the inflatable recreation device to a gas station for proper inflation. Under these circumstances, a portable pressurized air source also would be desirable as an alternative air source.

There are some inflating devices which provide pressurized air to an inflatable object. For example, a mechanical air compressor or a storage tank of high-pressure air can be used for this purpose. However, a mechanical air compressor is relatively expensive and requires a power source. It typically is heavy. As such, a mechanical air compressor may not be a viable option for a stranded motorist. On the other hand, a pressurized air storage tank may be made portable and relatively cheap, but its capacity would be limited in order to be portable and cheap. Besides, it requires replenishment once its content is consumed, and such replenishment requires an air compressor. While hand pumps or foot pumps are a relatively inexpensive alternative for supplying air to an inflatable object, they require physical labor to generate the required air. To inflate a relatively large object, it may take a long time for a person of average physical fitness.

Therefore, there exists a need for an inflating device which requires minimal human interaction and does not require a power source to operate. Furthermore, it would be desirable that the capacity of such a device not be limited.

SUMMARY OF THE INVENTION

The invention disclosed herein meets the above need by providing an inflating device and a method for inflating an inflatable object. In one aspect, the invention relates to an inflating device. The inflating device includes: (1) a first component containing a gas-generating agent which is not in the gaseous state; (2) a second compartment containing an activating agent separated from the gas-generating agent; (3) an activator connected to the first and second compartments; and (4) a hose assembly with one end adaptable for connection to an inflatable object and the other end connected to the compartment in which the gas is generated. In this device, the activating agent is capable of producing a gas in situ when in contact with the gas-generating agent. The activator is capable of effectuating contact between the gas-generating agent and the activating agent upon activation. In some embodiments, the in situ generated gas is carbon dioxide. The gas-generating agent for carbon dioxide may be selected from one or more of the following compounds: sodium carbonate, sodium bicarbonate, potassium bicarbonate, ammonia bicarbonate, and calcium carbonate. The activating agent for the gas-generating agent for carbon dioxide may be an acid, such as acetic acid, citric acid, maleic acid, polyacrylic acid, phosphoric acid, sodium sulfuric acid, and tartaric acid. In addition to carbon dioxide, any other gases, such as nitrogen, oxygen, hydrogen, may be generated with an appropriate gas-generating agent and an activating agent.

In another aspect, the invention relates to an inflating device. The device includes: (1) a first compartment containing a gas-generating agent not in the gaseous stage; (2) a second compartment containing an activating agent separated from the gas-generating agent; (3) a means for effectuating contact between the gas-generating agent and the activating agent upon activation; and (4) a means for delivering the gas to an inflatable object. The activating agent is capable of producing a gas in situ when in contact with the gas-generating agent.

In yet another aspect, the invention relates to a method for inflating an inflatable object. The method includes: (1) providing a gas-generating agent which is not in the gaseous state; (2) providing a activating agent separated from the gas-generating agent which is capable of producing a gas in situ when in contact with the gas-generating agent; (3) contacting the gas-generating agent with the activating agent to generate a gas in situ; and (4) delivering the gas to an inflatable object.

Embodiments of the invention offers numerous advantages which become apparent with the following description.

DESCRIPTION OF THE EMBODIMENTS OF THE INVENTION

Figure 1:
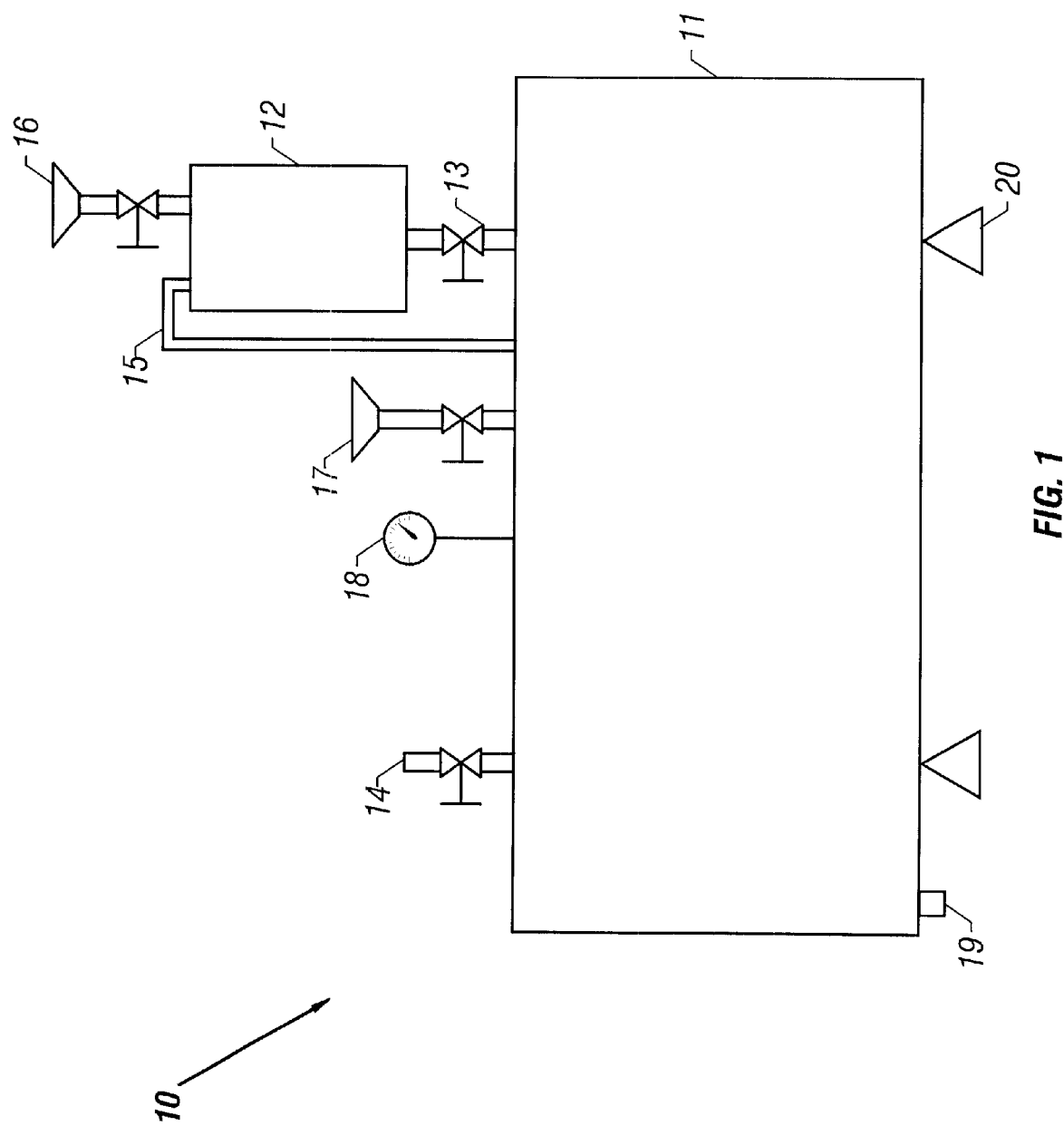
FIG. 1 illustrates an inflating device with separate compartments for a gas generating agent and an activating agent in accordance with one embodiment of the invention.

Embodiments of the invention are based, in part, on the recognition that a gas produced by a chemical reaction between two or more compounds may be utilized as a gas source for various inflatable objects. In accordance with embodiments of the invention, an inflating device is provided. The inflating device may include two compartments: one containing a gas-generating agent which is not a gas itself; and the other compartment containing an activating agent which is separated from the gas-generating agent. The activating agent is capable of producing a gas in situ when in contact with the gas-generating agent. The inflating device may further include an activator (which is a component of the inflating device and bears no relationship to the activating agent) connected to the first and the second components. The activator is capable of effectuating contact or mixing between the gas-generating agent and the activating agent upon activation to generate a gas in situ. Furthermore, the inflating device also may include a hose assembly with one end adaptable for connection to an inflatable object and the other end connected to the compartment in which the gas is generated.

The gas may be generated in the first compartment by mixing the activating agent with the gas-generating agent in the first compartment or in the second compartment by mixing the activating agent and the gas-generating agent in the second compartment. Alternatively, the gas could be generated in a third compartment in which the mixing of the gas-generating agent the activating agent occurs.

The term "inflatable object" refers to any hollow object which requires air or its equivalents for proper inflation. For example, an inflating object includes, but is not limited to, a tire, a floatable recreational toy, a life saver, a floatation device, a floatable boat, and air mattress, a balloon, etc.

It should be recognized that any gas that can be produced by a chemical reaction of two or more compounds may be used in embodiments of the invention. In fact, a variety of chemical reactions may be utilized to generate a desired gas, such as nitrogen, carbon dioxide, oxygen, hydrogen, nitrous oxide, noble gases, etc. Preferably, the gas-generated should be non-flammable, non-toxic, and environmentally friendly.

Suitable gas-generating agents and their corresponding activating agents vary, depending upon the type of gases utilized to inflate an inflatable object. For example, if nitrogen gas is desired, suitable gas-generating agents include, but are not limited to, hydrazines, azodicarbonamides, and sodium azides. Suitable activators include, but are not limited to, iodine, hydrogen peroxide, iron oxide, chloramine, and heat. To generate oxygen, hydrogen peroxide may be reacted with potassium permanganate or other compounds. To produce hydrogen by a chemical reaction, water may be reacted with a reactive metal (such as a Group IA or IIA metal of the Periodic Table of Elements) or a metal hydride. Other chemical reactions that generate a gas may also be used.

In some embodiments, carbon dioxide is utilized to inflate an inflatable object. Carbon dioxide offers the following advantages. First, it is relatively easy to generate carbon dioxide from a variety of gas-generating agents and activators. Second, the cost of generating carbon dioxide using these chemical compounds are relatively low. Third, these carbon dioxide generating compounds are safe. In fact, many of them are used as food stuff. Finally, carbon dioxide is not toxic, non-flammable, and not detrimental to the ozone layer. Numerous carbonate compounds may be used to generate carbon dioxide in the presence of an acid. In fact, any metal carbonate or ammonium carbonate is suitable as a gas-generating agent for carbon dioxide. For example, potassium bicarbonate or mixtures of carbonate salts, such as potassium bicarbonate and ammonium carbonate, may be used. It should be noted that a suitable gas-generating agent can be used in solid, in a solution, or in a slurry. Preferably, the carbonate salt or mixtures thereof is dissolved or dispersed in a solvent system, such as water.

Table I lists some suitable activating agents, and Table II shows exemplary gas-generating agents for generating carbon dioxide. It should be understood that the composition ranges in the tables are merely exemplary and should not be construed as limiting. Suitable activators to generate carbon dioxide include, but are not limited to, any organic, inorganic, and polymeric acids that possess enough strength to liberate carbon dioxide from a gas-generating agent, such as potassium carbonate, potassium bicarbonate or mixtures of potassium bicarbonate and ammonium carbonate dissolved or dispersed in a solvent system (e.g., water). Preferably, the acid should have a dissociation constant K higher than $10^{-10}$ at ambient temperature. More preferably, acids with a dissociation constant higher than $10^{-8}$ should be used.

In some embodiments, a corrosion inhibitor, such as sodium nitrite, ammonia, and sodium chromate, is added to a solution containing an activating agent to prevent acid corrosion of the internal surface of a compartment. In addition, an anti-foaming agent or defoaming agent, such as silicone-base compounds, Defoamer®, and Dow Corning Antifoam®, may be used to prevent the formation of foams or to collapse foams rapidly if desired. On the other hand, some applications may desire foams. In these cases, foaming agents, such as Foamtaine®, may be added. In other embodiments, a dispersing agent is used with a gas-generating agent. Typical dispersing agents are compounds based upon polyacrylic acids, such as Dispex®. Wetting agents, such as Aerosol OT (i.e., sodium dis(2-ethylhexyl) sulfosuccinate), can be added if so desired.

In addition to an inflating device, embodiments of the invention also provide a method for inflating an inflatable object. The method includes: (1) providing a gas-generating which is not in the gaseous state; (2) providing an activating agent separated from the gas-generating agent which is capable of producing a gas in situ when in contact with the gas-generating agent; (3) contacting the gas-generating agent with the activating agent to generate a gas in situ; and (4) delivering the gas to an inflatable object.

TABLE I

Exemplary Activating Agent

| Ingredient | Typical Wt % | Preferred Range |
|---|---|---|
| Formula 1 | | |
| acetic acid | 60.0 | 5.0~100.0 |
| water | balance | balance |
| Formula 2 | | |
| citric acid | 50.0 | 5.0~80.0 |
| water | balance | balance |
| Formula 3 | | |
| maleic acid, anhydride | 50.0 | 5.0~80.0 |
| water | balance | balance |
| Formula 4 | | |
| polyacrylic acid | 50.0 | 5.0~100.0 |
| water | balance | balance |
| Formula 5 | | |
| sodium hydrogen sulfate | 30.0 | 5.0~70.0 |
| water | balance | balance |
| Formula 6 | | |
| phosphoric acid | 20.0 | 5.0~100.0 |
| tartaric acid | 30.0 | 5.0~80.0 |
| water | balance | balance |

TABLE II

Exemplary Gas-Generating Agent

| Ingredient | Typical Wt % | Preferred Range |
|---|---|---|
| Formula 7 | | |
| sodium bicarbonate | 50.0 | 5.0~90.0% |
| sodium polyacrylate | 5.0 | 0.1~20.0 |
| water | balance | balance |
| Formula 8 | | |
| sodium carbonate | 50.0 | 5.0~90.0% |
| sodium polyacrylate | 5.0 | 0.1~20.0 |
| water | balance | balance |
| Formula 9 | | |
| potassium bicarbonate | 50.0 | 5.0~90.0% |
| sodium polyacrylate | 5.0 | 0.1~20.0 |
| water | balance | |
| Formula 10 | | |
| potassium carbonate | 50.0 | 5.0~90.0% |
| water | balance | balance |
| Formula 11 | | |
| ammonium bicarbonate | 50.0 | 5.0~90.0% |
| sodium polyacrylate | 5.0 | 0.1~20.0 |
| water | balance | balance |
| Formula 12 | | |
| ammomum carbonate | 50.0 | 5.0~90.0% |
| sodium polyacrylate | 5.0 | 0.1~20.0 |
| water | balance | balance |
| Formula 13 | | |
| ammonium bicarbonate | 10.0 | 5.0~90.0% |
| potassium bicarbonate | 40.0 | 5.0~90.0% |
| sodium polymethacrylate | 5.0 | 0.1~20.0 |
| water | balance | balance |
| Formula 14 | | |
| ammonium bicarbonate | 10.0 | 5.0~90% |
| calcium carbonate | 40.0 | 5.0~90.0% |
| sodium polyacrylate | 5.0 | 0.1~20.0 |
| water | balance | balance |

FIG. 1 illustrates one embodiment of the invention. Referring to FIG. 1, inflating device 10 includes a first compartment 11 and a second compartment 12. The first compartment 11 serves as a reservoir for a gas-generating agent, whereas the second compartment 12 is a reservoir for an activating agent. Of course, an activating agent may be placed in the first compartment, and the gas-generating agent may be placed in the second compartment 12. In this specific embodiment, the second compartment is placed above the first compartment 11. This setup is to use gravity to add the content of the second compartment 12 to the first compartment 11. When it is desirable to add the content of the second compartment 12 to the first compartment 11, the addition valve 13 placed between the first compartment 11 and the second compartment 12 is adjusted, either manually or automatically. The addition valve 13 is an activator which effectuates the mixing or contact between the content in the first compartment 11 and the second compartment 12. Other devices that allows mixing or contacting of the two components may also be used.

In this particular embodiment, gravity is utilized in effectuating contact between a gas generating agent and an activating agent. However, in other embodiments, gravity need not be used. In other words, the two compartments may be placed on the same level. In those embodiments, the mixing may be facilitated by a hand pump or a propellant. Other suitable dispensing mechanisms include, but are not limited to, positive displacement such as piston operated devices, pre-pressurization by a minimal amount of inert gas such as bag-in-can, or by other mechanical means such as the contracting elastic force of a pre-filled rubber tube. All these systems preferably dispense the gas-generating agent and the activating agent in a constant ratio and allow for good mixing before the mixture entering an inflatable object.

Still referring to FIG. 1, the inflating device 10 further includes a pressure equalizer 15 connecting the first compartment 11 and the second compartment 12. The pressure equalizer 15 is a side arm which functions to equalize the pressure inside the first compartment and the second compartment, thus allowing the content in the second compartment 12 to be added easily by gravity through the addition valve 13 to the first compartment 11. Other devices which equalize the pressure in the two compartment also may be used. In this embodiment, the first compartment 11 also function as the pressure tank. This means that a gas is generated in this compartment. This is entirely arbitrary because the second compartment also may be used as a pressure tank.

According to FIG. 1, the inflating device 10 includes two respective refill ports 16 and 17 for both compartments. It further includes a pressure gauge 18 which allows easy monitoring of the pressure inside the second compartment 11. A gas output port 14 is attached to the first compartment 11 so that the gas generated may be delivered by a flexible hose with adaptors and valves to an inflatable object. In addition to a hose assembly, any other gas delivery devices may also be used here. For example, other means for delivering the gas to an inflatable object includes metal tubes or similar devices. Moreover, other means for effectuating contact between the gas generating agent and the activating agent includes dropping the carbonate salt into the acid. The inflating device 10 also may include a plurality of support elements 20.

While it is preferred that the gas-generating agent and the activating agent be premixed to produce a gas to be delivered to an inflatable object, this does not preclude other alternatives. For example, the gas need not be generated before it is delivered to an inflatable object. Instead, a gas-generating agent and an activating agent may be delivered to an inflatable object simultaneously or sequentially. In these circumstances, the mixing of the gas-generating agent and the activating agent occurs inside the inflatable object. The gas generated inside inflates the inflatable object. The pressure may be controlled by the amounts of the gas-generating agent and the activating agent delivered to the inflatable object. Alternatively, there may be a third compartment which allows the mixing between the gas-generating agent and the activating agent. The gas generated in the third compartment may subsequently be delivered to an inflatable object.

The following examples illustrates embodiment of the invention. These examples are merely exemplary and are not intended to limit the scope of the invention as otherwise described herein.

EXAMPLE 1

About 5 lbs. of a gas-generating agent with formula 10 was stored in a tank of about 1.0 cubic foot. Various amounts of an activating agent according to formula 2 was added to the tank through an addition valve as illustrated in FIG. 1. The tank pressure was monitored as a function of the amount of the activating agent added. The data are presented in Table 3 as follows.

TABLE III

| Formula 2 added, lb. | Tank Pressure, psi |
|---|---|
| 0.2 | 9 |
| 0.4 | 19 |
| 0.6 | 27 |
| 0.8 | 36 |
| 1.0 | 45 |
| 1.2 | 54 |
| 1.4 | 63 |
| 1.6 | 72 |
| 1.8 | 81 |
| 2.0 | 90 |

This example demonstrates that significant gas pressure may be generated in embodiments of the invention. Furthermore, by adjusting the amount of an activating agent added, it is possible to control the desired gas pressure.

EXAMPLE 2

About 12 oz. of a gas-generating agent according to formula 7 was stored in a tank of about 0.5 cubic foot. About 7 oz. of an activating agent according to formula 3 was continuously added to the tank through an addition valve as illustrated in FIG. 1. The gas output port of the tank was connected to a small inflatable boat whose inner air space was about 4 cubic feet. The inflated pressure of the boat was about 1 to 5 psi, depending on how much the boat was stretched out before inflation.

EXAMPLE 3

This example demonstrates that the inflating device can be used to inflate a flat tire. About 15 oz. of a gas-generating agent having formula 9 was stored in a tank of about 1 liter. Then, about 9.2 oz. of an activating agent having formula 1 was continuously added to the tank through an addition valve. The apparatus was set up substantially similar to the one illustrated in FIG. 1. The gas outlet port of the tank was connected to the valve of a flat tire of size P195/75R14. The tire pressure increased relatively quickly as evidenced by the rising of the tire from flat to full. The final tire pressure was approximately 28 psig.

As demonstrated above, embodiments of the invention provide an inflating device which is capable of inflating various inflatable objects. The embodiments of the invention may offer one or more of the following advantages. First, the inflating device may be used to generate a gas to inflate an inflatable object anytime and anywhere economically. No substantial manual labor is required to operate the inflating device to inflate an object. The device has unlimited capacity, provided that the activating agent and the gas-generating agent are supplied through the refill ports. Because such an inflating device does not require a power source to operate, it is relatively versatile and can be used in any circumstances. Moreover, the performance of the inflating device is not dependent upon the ambient temperature. Therefore, the inflating device can readily be used in inclement weather, either extremely cold or hot weather. Due to the simplicity of the inflating device, it is relatively cost-effective to manufacture the device. Other advantages are apparent to those skilled in the art.

While the invention has been described with respect to a limited number of embodiments, other modifications or variations exist. For example, although non-flammable, non-toxic, and environmentally-friendly gases are preferred, other gases that do not meet all three requirements may still be used in some embodiments of the invention. It should be recognized that any gas-generating chemical reactions may be used in embodiments of the invention. These reactions are not limited to those involving one gas-generating agent and one activator. Multiple gas-generating agents and/or multiple activators also may be used. Although activators are described as acids with respect to generating carbon dioxide, they are by no means limited to acids. For other gas-generating reactions, the activators may be basic or neutral. As to the construction of the tire sealing and inflating device, one or more components may be merged into another component so long as they operate to achieve the results of the device. With respect to the methods for inflating an object, any sequence of steps may be used. The appended claims are intended to cover all such modifications and variations as fall within the scope of the invention.

What is claimed is:

1. An inflating device, comprising:
a first compartment containing a gas-generating agent not in the gaseous state;
a second compartment containing an activating agent separated from the gas-generating agent, the activating agent capable of producing a gas in situ when in contact with the gas-generating agent;
an activator contemporaneously connected to the first and second compartments, the activator capable of effectuating contact between the gas-generating agent and the activating agent upon activation; and a hose assembly having two ends, one end adaptable for connection to an inflatable object, the other end connected to a compartment in which the gas is generated.

2. The inflating device of claim 1, wherein the gas-generating agent is capable of producing carbon dioxide.

3. The inflating device of claim 2, wherein the gas-generating agent is a carbonate compound.

4. The inflating device of claim 3, wherein the gas-generating agent is selected from the group consisting of sodium carbonate, sodium bicarbonate, potassium bicarbonate, potassium carbonate, ammonium bicarbonate, ammonium carbonate, and calcium carbonate.

5. The inflating device of claim 3, wherein the activating agent is an acid.

6. The inflating device of claim 5. wherein the activating agent is selected from the group consisting of acetic acid, citric acid, maleic acid, polyacrylic acid, phosphric acid, sodium sulfuric acid, and tartaric acid.

7. The inflating device of claim 1, wherein the gas-generating agent is capable of producing nitrogen.

8. The inflating device of claim 7, wherein the gas-generating agent is selected from the group consisting of hydrazine, azodicarbonamide and sodium azide.

9. The inflating device of claim 8, wherein the activating agent is selected from the group consisting of iodine, hydrogen peroxide, iron oxide, and chloramine.

10. The inflating device of claim 1, further comprising a pressure equalizer between the first compartment and the second compartment.

11. The inflating device of claim 1, further comprising a gas output port.

12. The inflating device of claim 1, further comprising a pressure gauge.

13. The inflating device of claim 1, further comprising a refill port.

14. The inflating device of claim 1, wherein the first compartment is located below the second compartment.

15. The inflating device of claim 14, wherein the activator is a valve connected to the first and the second compartments by a tube.

16. The inflating device of claim 1, wherein the first compartment has a refill port;

the gas-generating agent is a carbonate compound;

the activating agent is an acid separated from the carbonate compound, the second compartment having a refill port and located below the first compartment;

an addition valve connected to the first compartment and the second compartment;

a pressure equalizer connecting the first and the second compartment;

a pressure gauge located on the second compartment; and a gas output port located on the second compartment.

17. A method for inflating an inflatable object, comprising:

obtaining an inflating device, comprising a first compartment containing a gas-generating agent not in the gaseous state;

a second compartment containing an activating agent separated from the gas-generating agent, the activating agent capable of producing a gas in situ when in contact with the gas-generating agent;

an activator contemporaneously connected to the first and second compartments, the activator capable of effectuating contact between the gas-generating agent upon activation; and a hose assembly having two ends, one end adaptable for connection to an inflatable object, the other end connected to a compartment in which the gas is generated.

effectuating contacting the gas-generating with the activating agent to generate a gas in situ; and delivering the gas to an inflatable object.

\* \* \* \* \*